(12) United States Patent
Kim

(10) Patent No.: US 10,022,638 B2
(45) Date of Patent: Jul. 17, 2018

(54) WHEEL FOR PREFABRICATED TOY USING CHAIN BLOCK

(71) Applicant: IRINGO CO., LTD, Incheon (KR)

(72) Inventor: Kwan-young Kim, Incheon (KR)

(73) Assignee: IRINGO CO., LTD, Incheon (KR)

( * ) Notice: Subject to any disclaimer, the term of this patent is extended or adjusted under 35 U.S.C. 154(b) by 39 days.

(21) Appl. No.: 15/248,758

(22) Filed: Aug. 26, 2016

(65) Prior Publication Data

US 2016/0375368 A1    Dec. 29, 2016

Related U.S. Application Data

(63) Continuation of application No. PCT/KR2015/001896, filed on Feb. 26, 2015.

(30) Foreign Application Priority Data

Mar. 11, 2014    (KR) .................. 10-2014-0028338

(51) Int. Cl.
| | | |
|---|---|---|
| *A63H 17/26* | (2006.01) | |
| *A63H 33/04* | (2006.01) | |
| *A63H 33/08* | (2006.01) | |
| *B60B 27/06* | (2006.01) | |

(52) U.S. Cl.
CPC .......... *A63H 17/262* (2013.01); *A63H 33/04* (2013.01); *A63H 33/08* (2013.01); *B60B 27/065* (2013.01); *B60B 2900/351* (2013.01)

(58) Field of Classification Search
CPC .... A63H 17/002; A63H 17/262; A63H 33/04; A63H 33/10; A63H 33/101; A63H 33/102
See application file for complete search history.

(56) References Cited

U.S. PATENT DOCUMENTS 3,811,218 A * 5/1974 Salmon ................ A63H 17/002
    446/94
3,985,392 A * 10/1976 Bergmann ........... A63H 17/262
    301/64.706
(Continued)

FOREIGN PATENT DOCUMENTS

KR    1989-0007419 Y1    10/1989
KR    20-0213589 Y1    2/2001
(Continued)

*Primary Examiner* — Gene Kim
*Assistant Examiner* — Alyssa Hylinski
(74) *Attorney, Agent, or Firm* — Jefferson IP Law, LLP

(57) ABSTRACT

A wheel for a prefabricated toy using a chain block is provided. The wheel is formed by assembling a wheel assembly, and a drum into which an assembling piece of the chain block is inserted and assembled, and in which the drum has a sill formed at a cylindrical body such that the drum and the wheel assembly are assembled to spin with no traction while the drum is inserted into and assembled to a mounting hole of the wheel assembly, coupling parts having a polygonal shape are formed at both surfaces of the cylindrical body of the drum so as to be simply assembled regardless of an assembling angle of the assembling piece and the wheel, and the wheel itself is utilized as the assembling piece or the drum embedded in the wheel is separated to be utilized as the assembling piece.

4 Claims, 17 Drawing Sheets

(56) References Cited

U.S. PATENT DOCUMENTS

| | | | | |
|---|---|---|---|---|
| 4,043,603 | A | * | 8/1977 | Bergmann ............ A63H 17/262 |
| | | | | 152/301 |
| 4,840,599 | A | * | 6/1989 | Ming ................... A63H 17/262 |
| | | | | 301/118 |
| 7,614,707 | B2 | * | 11/2009 | Jabbour, Jr. ............ B60B 3/001 |
| | | | | 301/111.01 |
| D753,773 | S | * | 4/2016 | Kim ............................. D21/487 |
| 2007/0264901 | A1 | * | 11/2007 | Sisamos ............... A63H 33/062 |
| | | | | 446/90 |
| 2013/0178129 | A1 | * | 7/2013 | Habibi ................... A63H 33/04 |
| | | | | 446/91 |
| 2014/0120517 | A1 | * | 5/2014 | Webb ................... A63H 17/002 |
| | | | | 434/365 |

FOREIGN PATENT DOCUMENTS

| | | |
|---|---|---|
| KR | 20-0371983 Y1 | 1/2005 |
| KR | 10-1006464 B1 | 1/2011 |

* cited by examiner

WHEEL FOR PREFABRICATED TOY USING CHAIN BLOCK

CROSS-REFERENCE TO RELATED APPLICATION(S)

This application is a continuation application, claiming the benefit under § 365(c), of an International application filed on Feb. 26, 2015 and assigned application number PCT/KR2015/001896, which claimed the benefit of a Korean patent application filed on Mar. 11, 2014 in the Korean Intellectual Property Office and assigned Serial number 10-2014-0028338, the entire disclosure of which is hereby incorporated by reference.

TECHNICAL FIELD

The present disclosure relates to a wheel for a prefabricated toy using a chain block, which is capable of being assembled at various angles, where the wheel itself is used as an assembly block, or a drum, which is embedded in the wheel to enable the wheel to be rotated, is separated from the wheel such that the drum may be used as a separated assembly block.

BACKGROUND

A prefabricated toy using a chain block includes an assembly member having a female or male inserting part, such that various structures may be assembled in a plane or cubic shape by connecting the inserting part of one assembly member to that of another assembly member in a chain type.

When a cubic structure, such as a vehicle, a motorcycle, a windmill, etc., requiring a rotary function is built up with such chain blocks, a wheel is assembled with the assembly member.

FIG. 1 is a perspective view showing a wheel for a prefabricated toy using a chain block according to the related art.

Referring to FIG. 1, in the structure of a wheel, an assembly member 100 is inserted into a drum 10 embedded in a wheel assembly 20 to allow the drum 10 and the wheel assembly 20 to be spun without traction, so that the rotational operation is performed (Korean Utility Model Registration No 20-0368839, Korean Utility Model Registration No. 20-0213589).

However, since the wheel has the structure in which the male coupling part of the assembly member is inserted into the drum, so that the wheel is always assembled at the same angle, it is difficult to secure various assembly directions, so that there is a limitation in constructing the shape of a cubic structure.

In addition, since the wheel can be used only for a simple rotary function, the wheel is quite useless when a structure having not any rotary functions is built up, so that the applicability is very bad.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wheel for a prefabricated toy using a chain block, which enable an assembly member and a wheel to be simply assembled regardless of an assembling angle of the assembly member and the wheel when a structure requiring a rotary function is built up and to enable the wheel itself to utilize as the assembly member.

Another aspect of the present disclosure is to provide a wheel for a prefabricated toy using a chain block, which enable a drum embedded in the wheel to be separated from the wheel such that the drum may be utilized as an assembly member, thereby allowing the wheel to be universally utilized and constructing structures in various shapes.

In accordance with an aspect of the present disclosure, a wheel is provided. The wheel includes a drum into which an assembly member of a chain block is inserted, and a wheel assembly 20 which is assembled with the drum, wherein the drum includes a cylindrical body and a sill formed on the cylindrical body and is fitted into an install hole of the wheel assembly such that the drum and the wheel assembly are assembled with each other to spin without traction, and the cylindrical body of the drum is provided on two surfaces with a polygonal-shaped coupling part, such that the assembly member is inserted into the drum at various angles and separately assembled with the wheel itself or the drum embedded in the wheel.

According to the wheel for a prefabricated toy using a chain block of the present disclosure, since the wheel itself or the drum embedded in the wheel may be independently used as the assembly member, the wheel or drum may be variously utilized for shaping the structure, the choice of selection in block assembly may be widened, and the creativity of children may be increased.

In addition, since the assembly members may be inserted from both sides of the wheel to be assembled and in addition, the assemble members may be assembled at mutually different angles, a cubic structure may be more variously implemented. Further, since several wheels are assembled with each other so that the width of the wheel may be extended, various shaped structures such as large-size vehicles or rotary members may be expressed more realistically and precisely.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
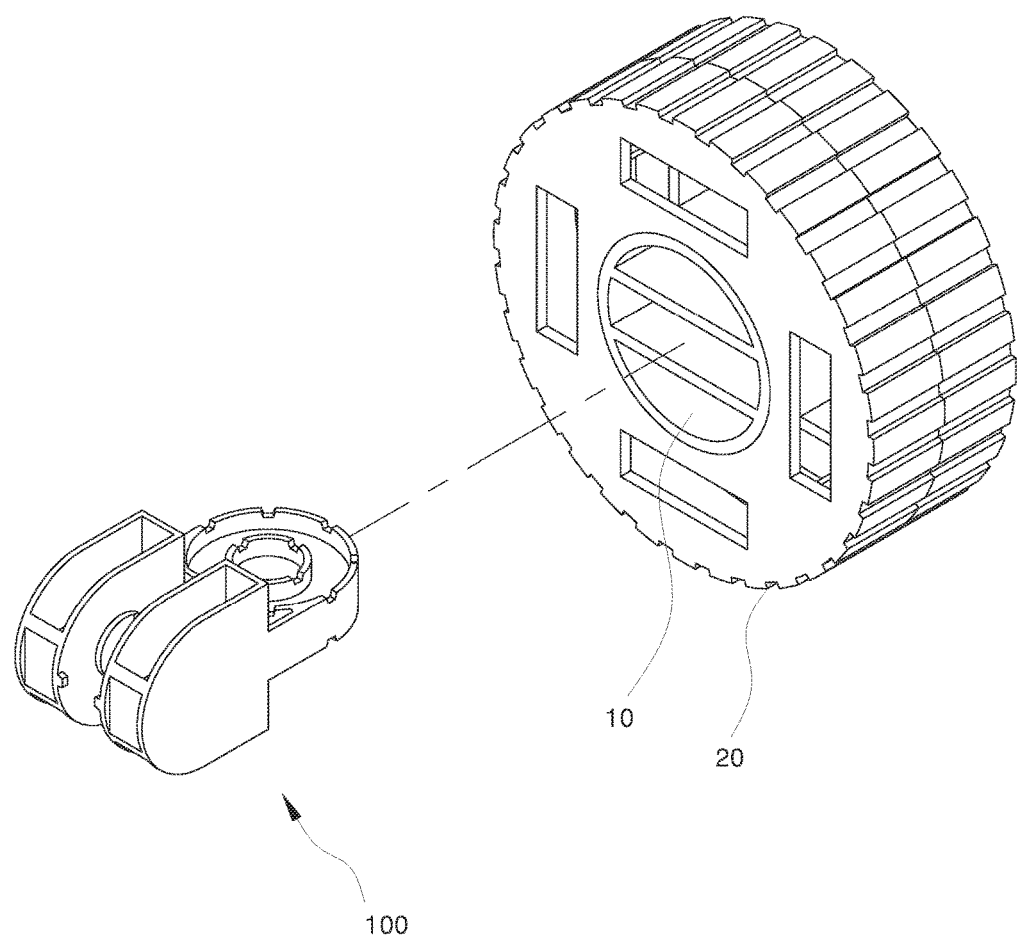
FIG. 1 is a perspective view showing a wheel for a prefabricated toy using a chain block according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to a best mode of an embodiment of the present disclosure, there is provided wheel for a prefabricated toy using a chain block, which includes a drum (10) into which an assembly member (100) of the chain block is inserted, and a wheel assembly (20) which is assembled with the drum (10) to spin without traction, wherein the drum (10) comprises a cylindrical body (11) and a sill (12) formed on the cylindrical body (11), and is fitted into an install hole (22) of the wheel assembly (20) such that the drum (10) and the wheel assembly (20) are assembled with each other to spin without traction, wherein the cylindrical body (11) of the drum (10) is provided on two surfaces with a coupling part (13) which is utilized as an assembly member of the prefabricated toy by being fitted with a wheel or a drum.

Hereinafter, the present disclosure will be described in detail with reference to accompanying drawings as follows.

Figure 2:
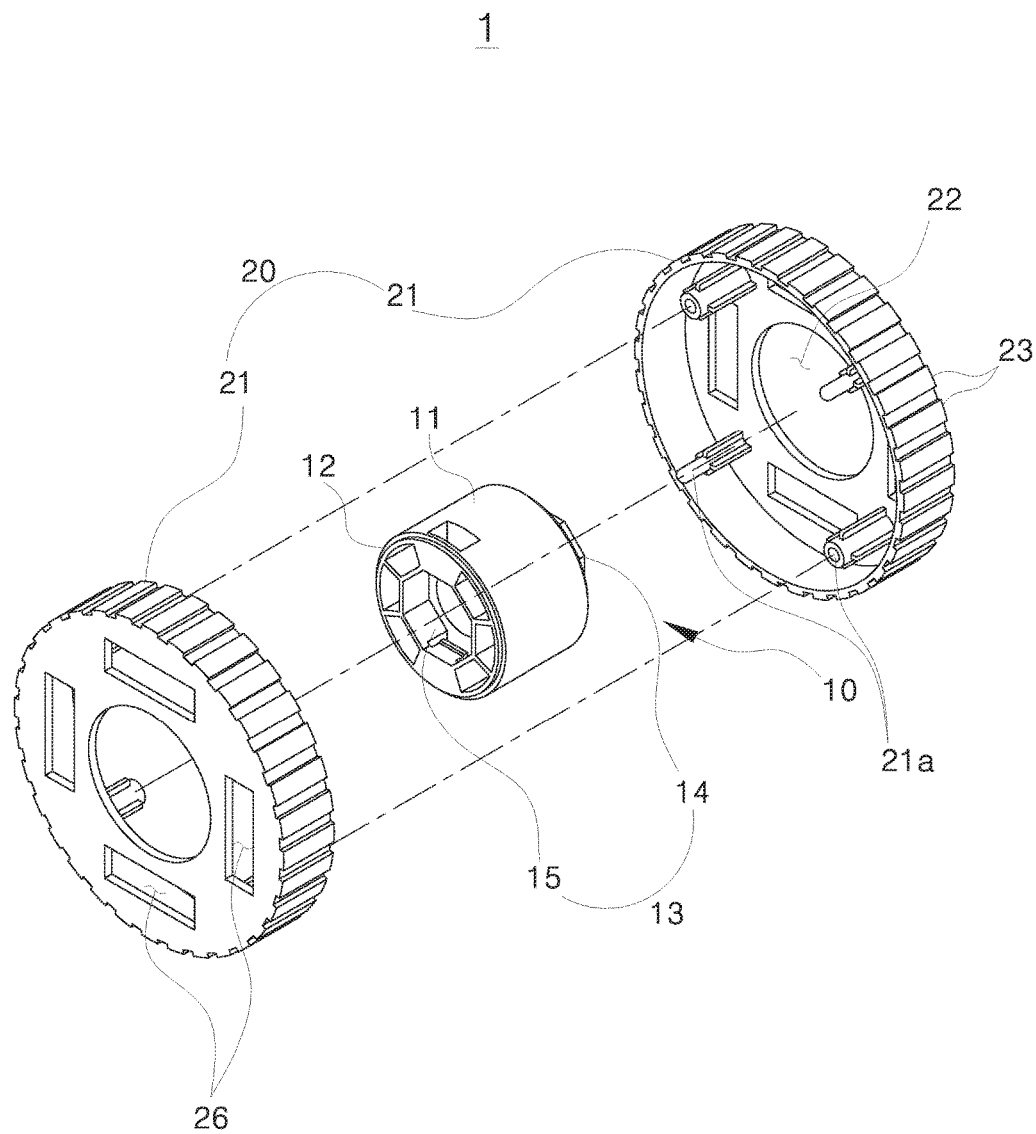
FIG. 2 is an exploded perspective view showing a wheel for a prefabricated toy using a chain block according to an embodiment of the present disclosure.
Figure 3:
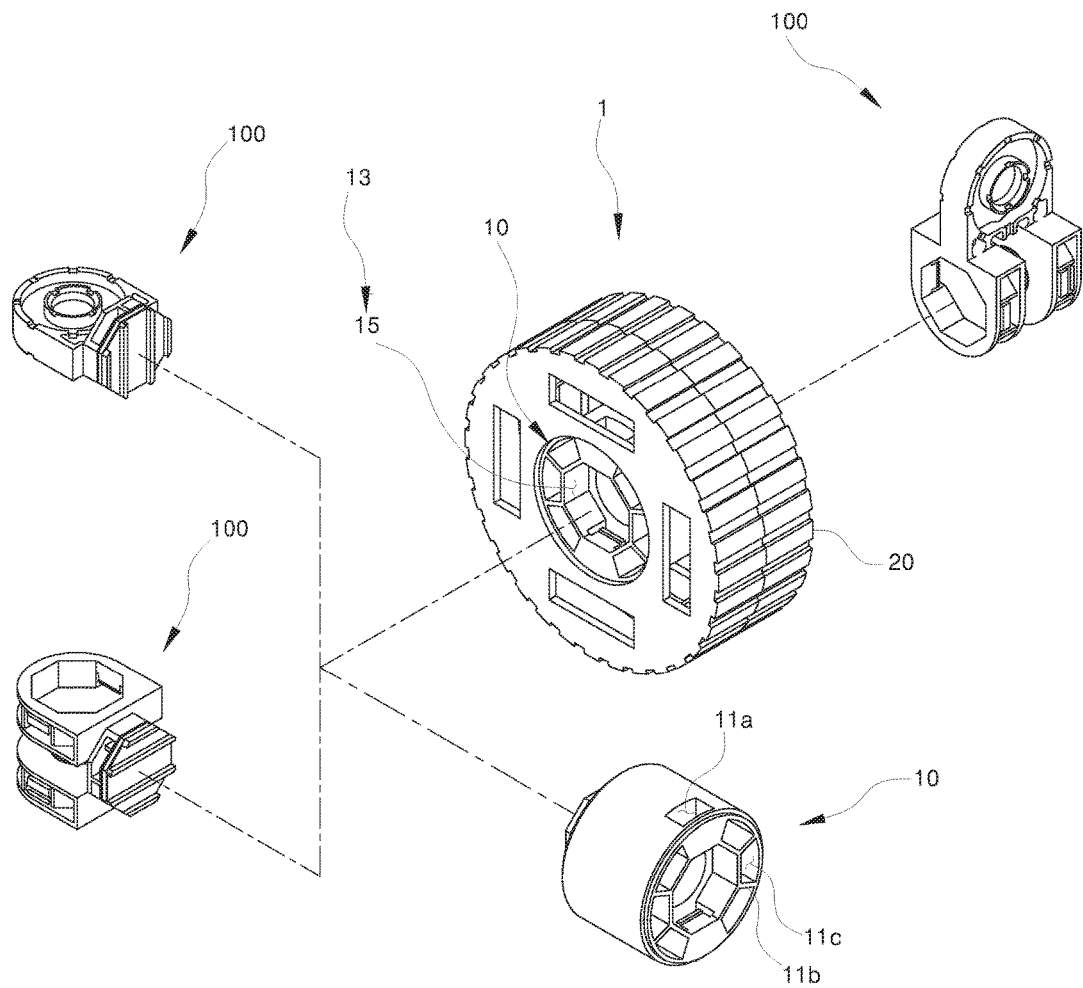
FIG. 3 is a perspective view showing an installing structure of a wheel according to an embodiment of the present disclosure.

FIG. 2 is an exploded perspective view showing a wheel for a prefabricated toy using a chain block according to an embodiment of the present disclosure. FIG. 3 is a perspective view showing an installing structure of a wheel according to an embodiment of the present disclosure.

Referring to FIGS. 2 and 3, a wheel 1 according to the present disclosure includes a drum 10 used to be inserted into an assembly member 100 of a chain block and a wheel assembly 20 coupled to the drum 10 to spin without traction to perform a rotary function.

The drum 10, which is inserted into the assembly member 100 to be fixed, includes a cylindrical body 11 and a sill 12 formed on both ends of the cylindrical body 11 assembled with a central portion of the wheel assembly 20. The wheel assembly 20 includes an install hole 22 into which the sill 12 is latched to be fixed thereto. A portion on which the sill 12 is formed and the install hole 22 have an outer diameter and an inner diameter to be spaced apart from each other, such that the drum 10 and the wheel assembly 20 are assembled to spin without traction, thereby allowing the wheel 1 to have a rotary function.

The cylindrical body (11) is provided on both surfaces thereof with a coupling part 13 having a polygonal shape, such that the wheel 1 may be fitted with the assembly member 100, or several wheels 1 may be assembled with each other or may be assembled with each other after separating only the drum 10.

FIGS. 6, 7, 8, 9, 10, 11, and 12 are views illustrating using states of wheels assembled in various shapes according to an embodiment of the present disclosure.

Figure 6:
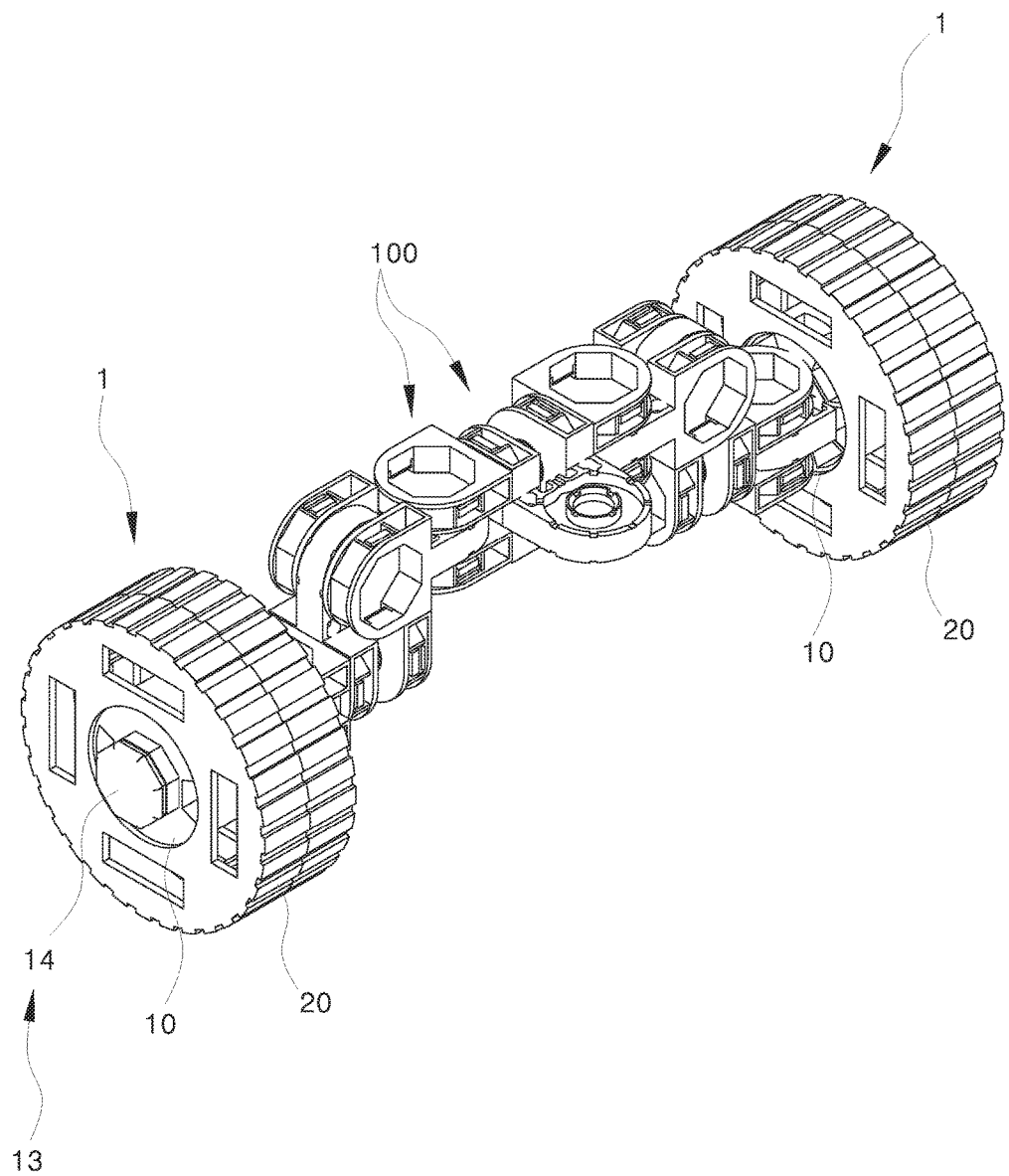
FIGS. 6, 7, 8, 9, 10, 11, and 12 are views illustrating using states of wheels assembled in various shapes according to an embodiment of the present disclosure.
Figure 7:
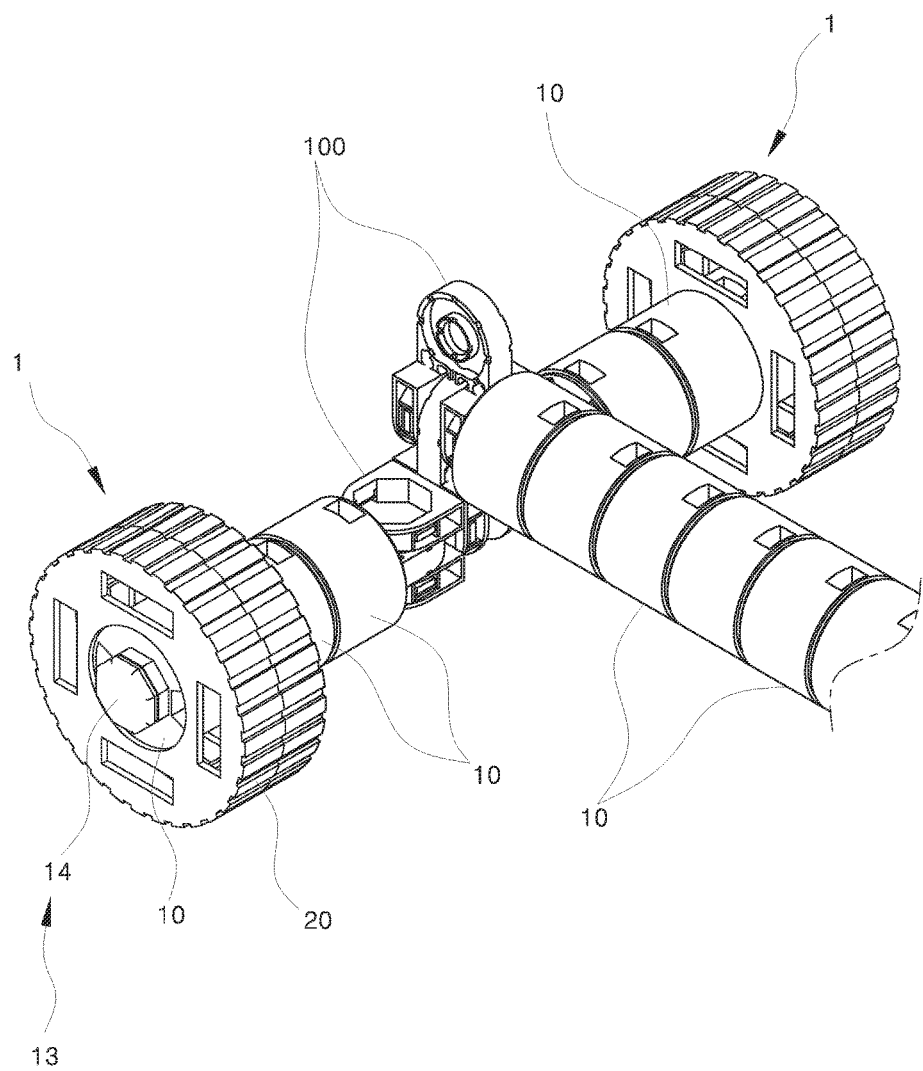
Figure 8:
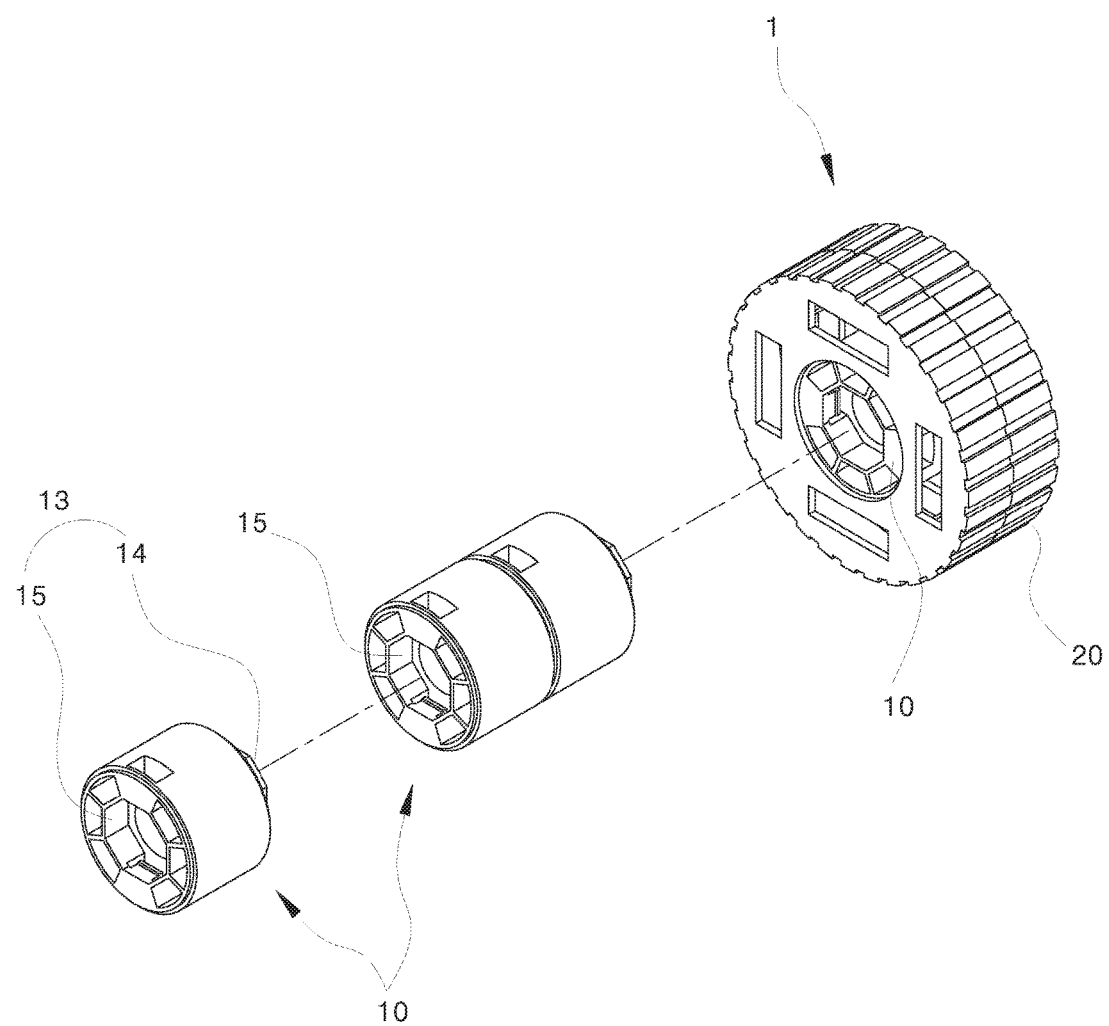
Figure 9:
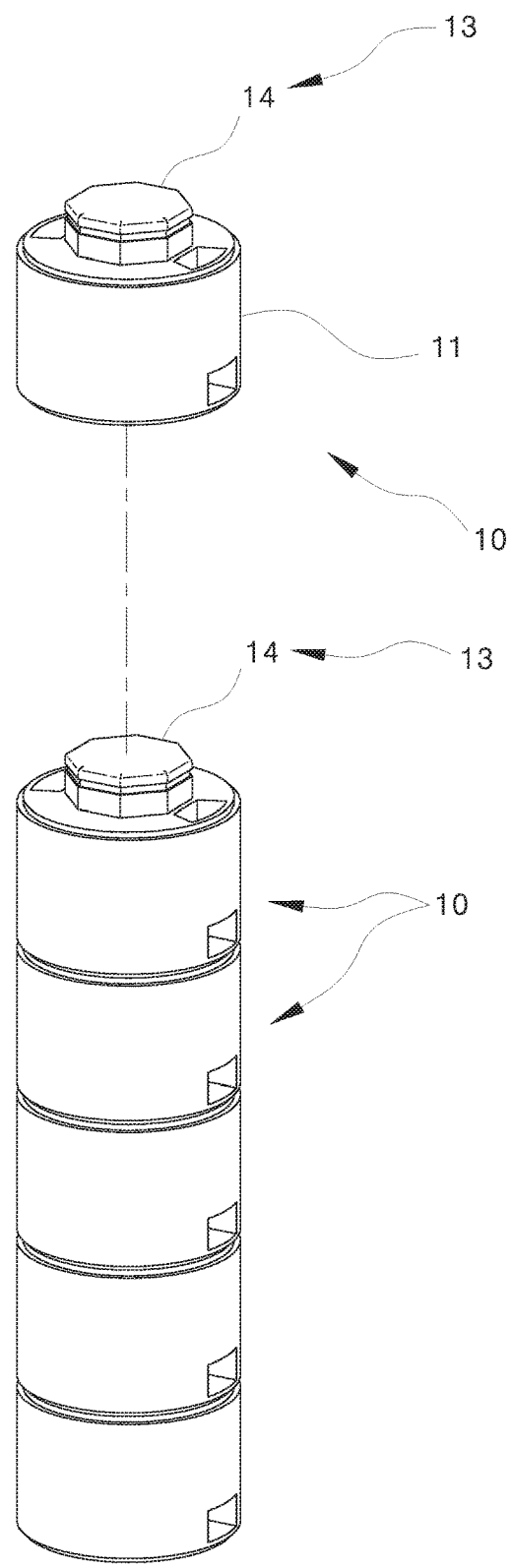
Figure 10:
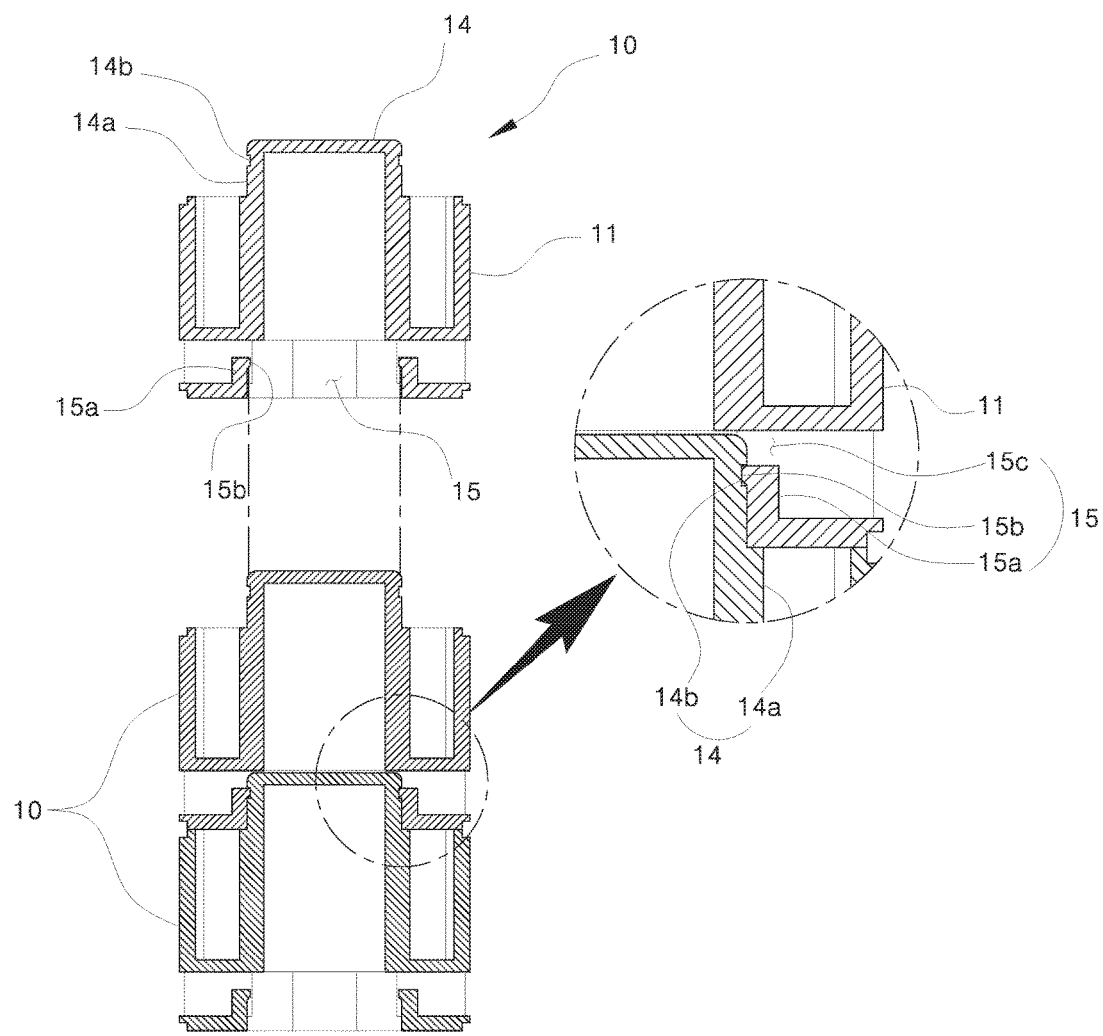
Figure 11:
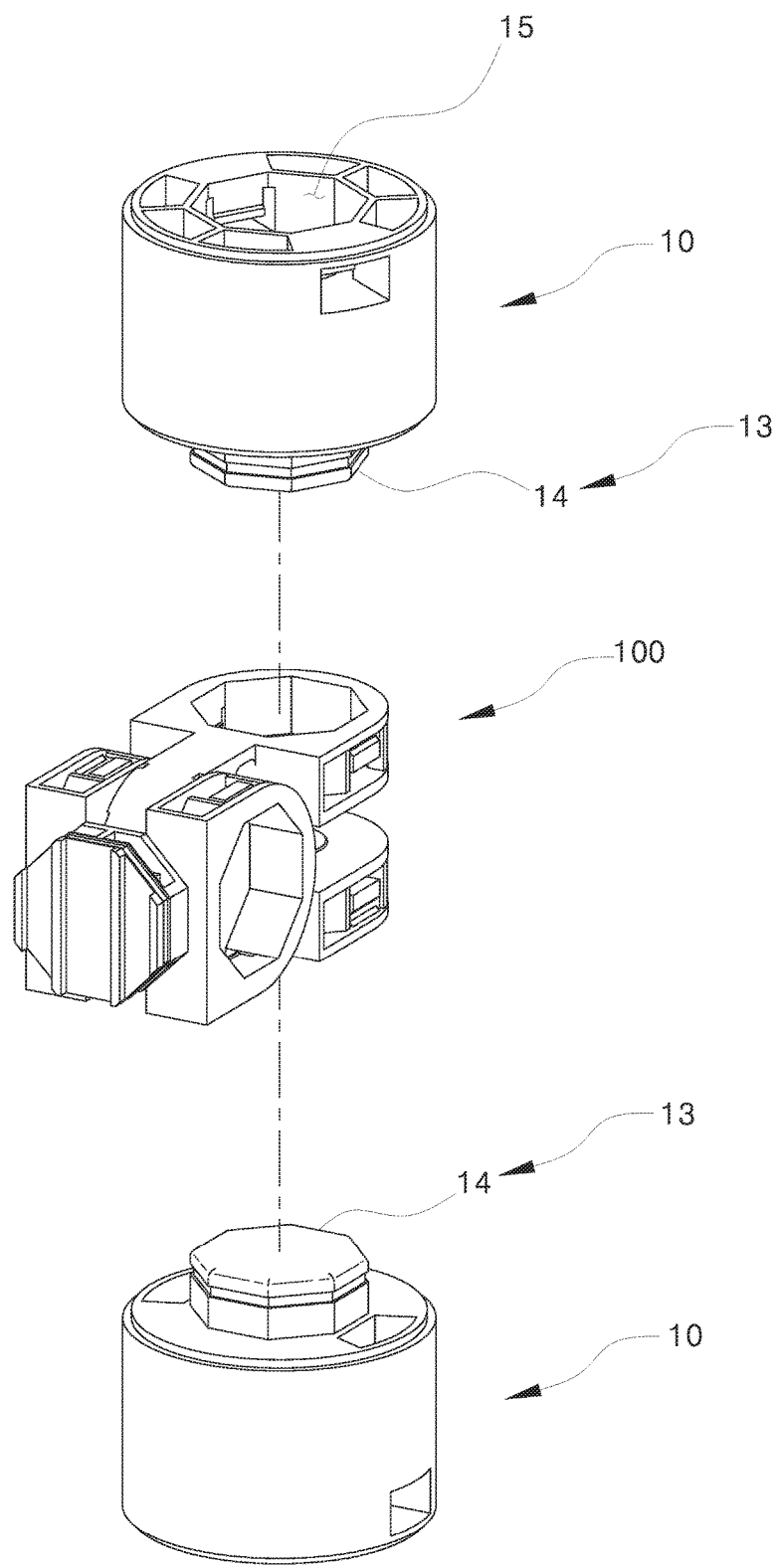

Referring to FIGS. 6 to 8, the wheel 1 may be used as a wheel when a structure of vehicle means such as a vehicle, a motorcycle, etc., or as a rotary member when a structure having a rotary function such as windmill, watermill, etc. Of course, referring to FIGS. 9 to 11, the wheel 1 may be utilized as a pillar or support of a structure.

Figure 12:
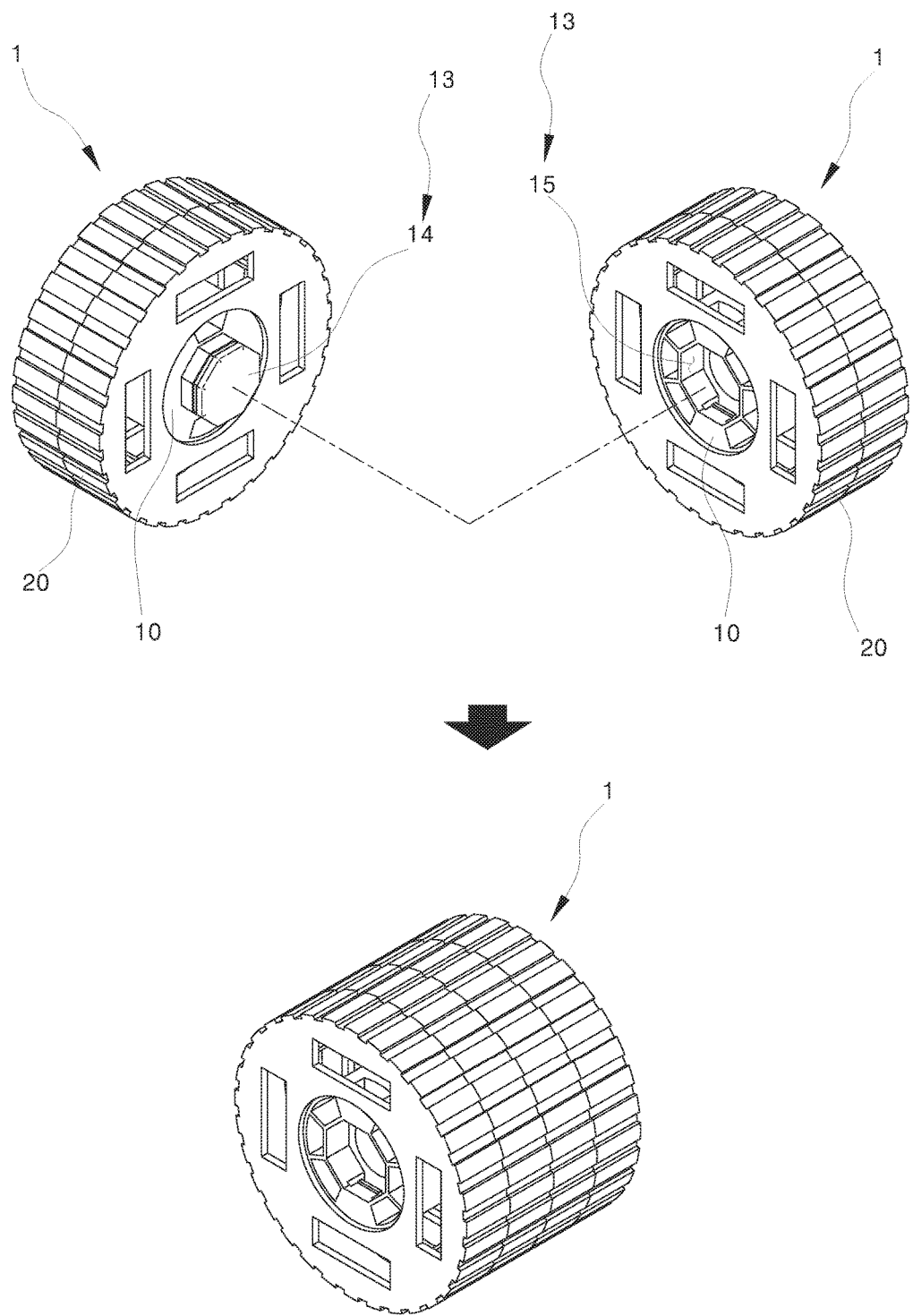

In addition, referring to FIG. 12, since several wheels 1 are connected to each other such that a wide wheel may be implemented, a structure such as a trailer or a heavy machine may be implemented more realistically and precisely.

The coupling part 13 formed on the drum 10 has a polygonal-shaped engagement structure formed in a concave or convex shape, such that, when the assembly member 100, the wheel 1 and the drum 10 are assembled with each other, they may simply be assembled with each other at various angles. More preferably, the coupling part 13 is formed to be concave or convex in an octagonal shape.

Figure 4:
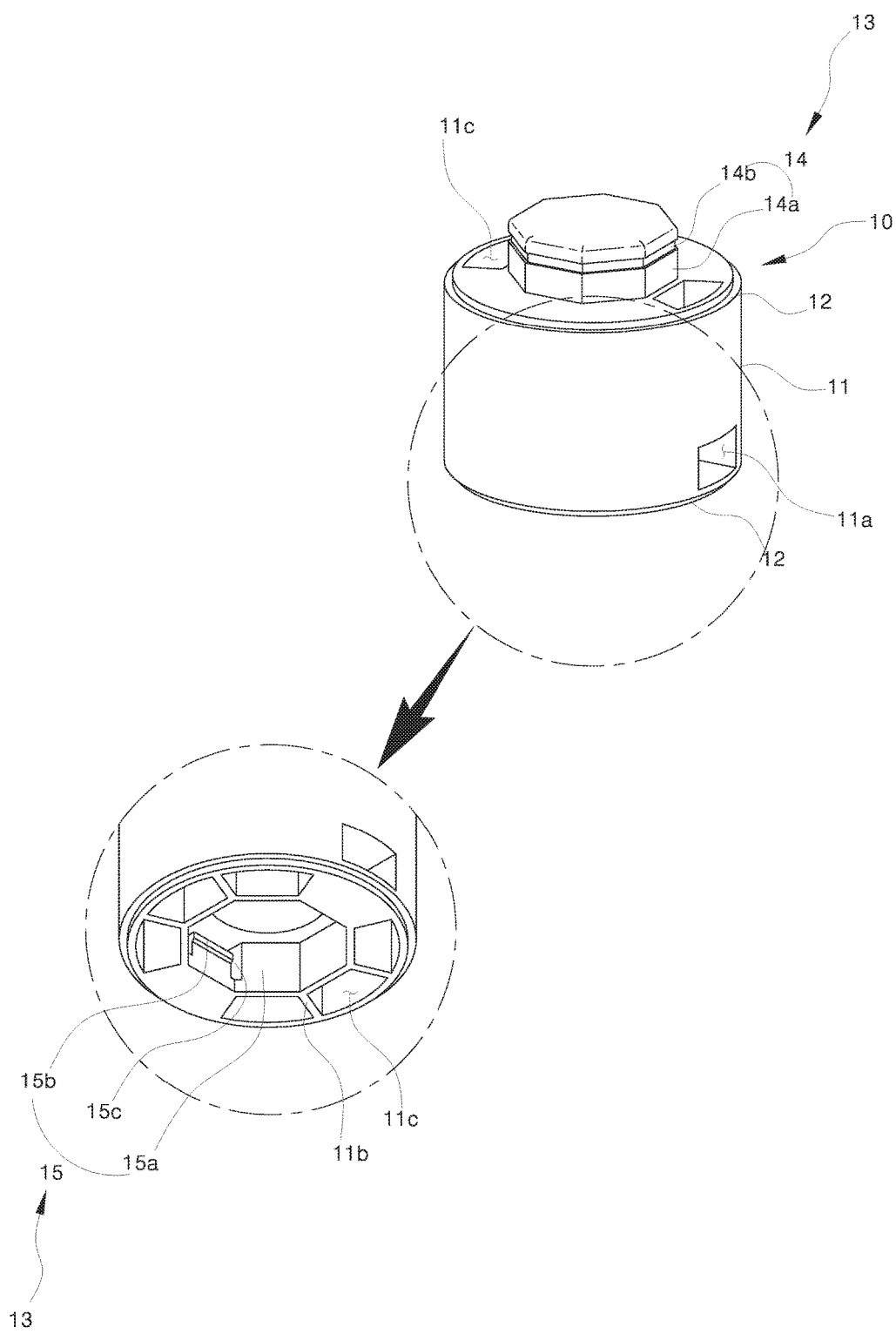
FIG. 4 is a perspective view showing a structure of a drum according to an embodiment of the present disclosure.
Figure 5:
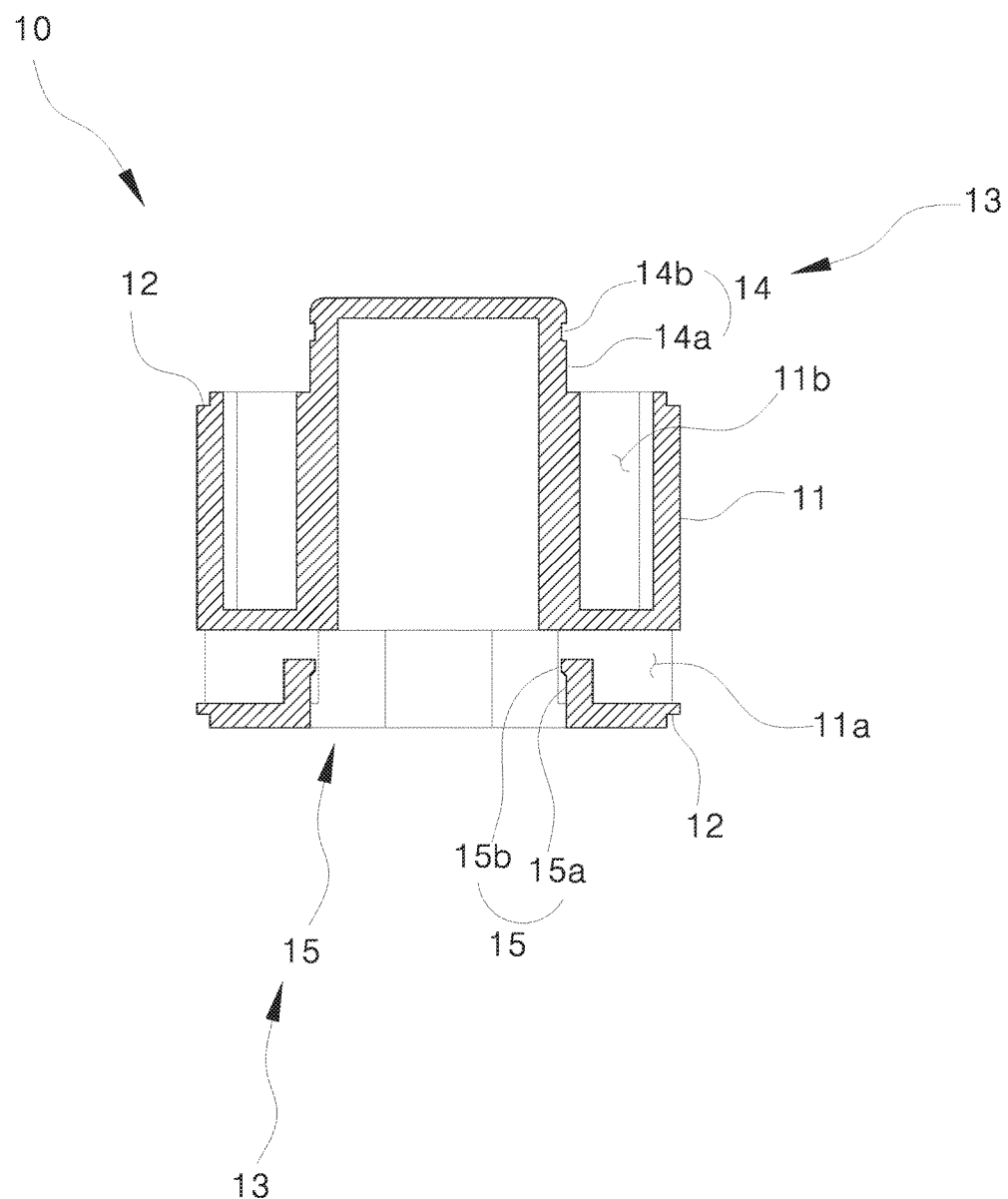
FIG. 5 is a sectional view of the drum of FIG. 4 according to an embodiment of the present disclosure.
Figure 13:
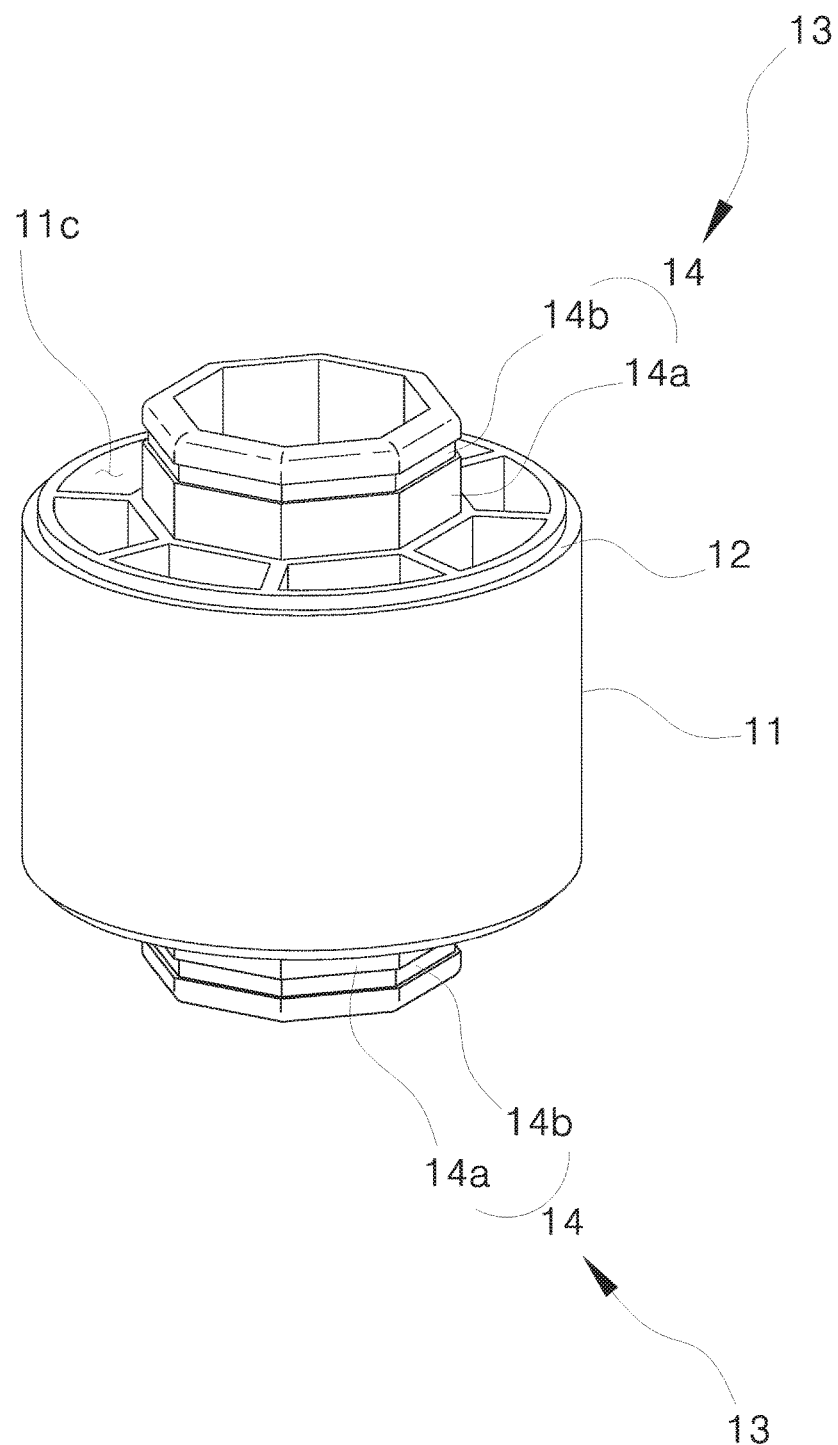
FIG. 13 is a perspective view showing a male coupling part formed on both surfaces of a drum according to an embodiment of the present disclosure.
Figure 14:
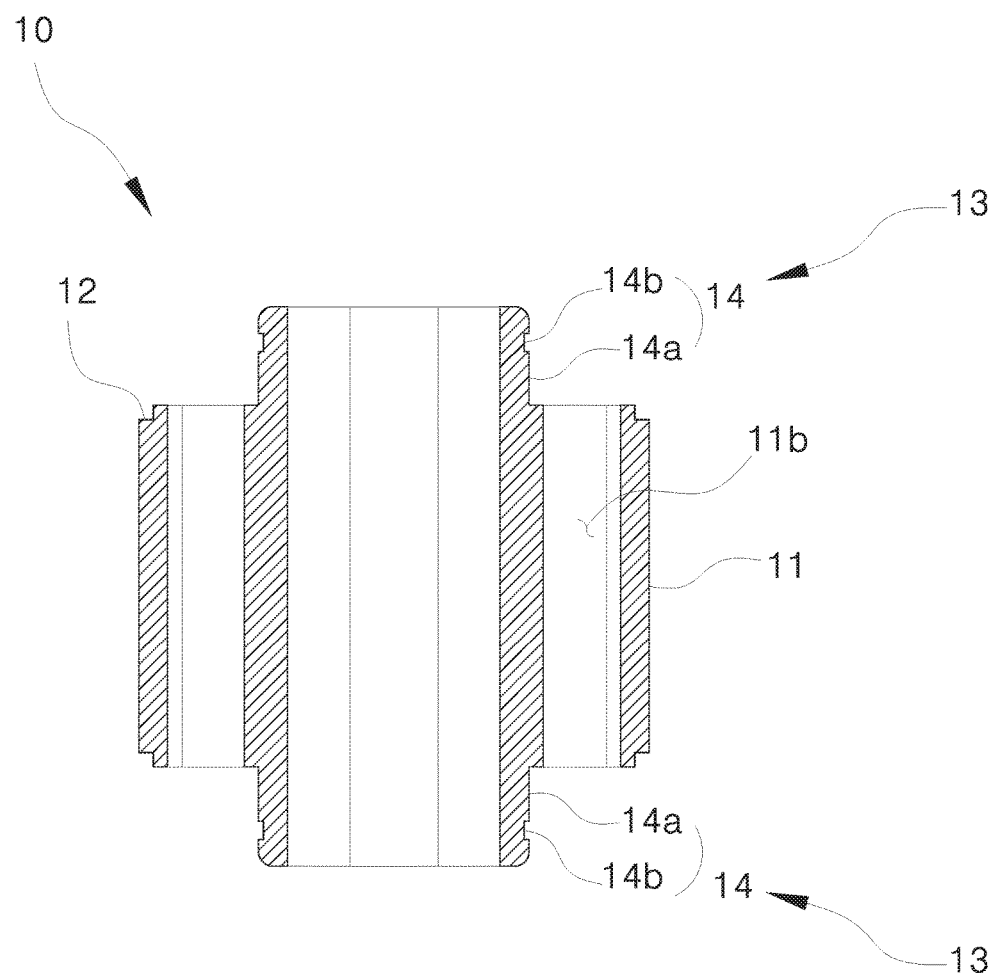
FIG. 14 is a sectional view of the drum of FIG. 13 according to an embodiment of the present disclosure.
Figure 15:
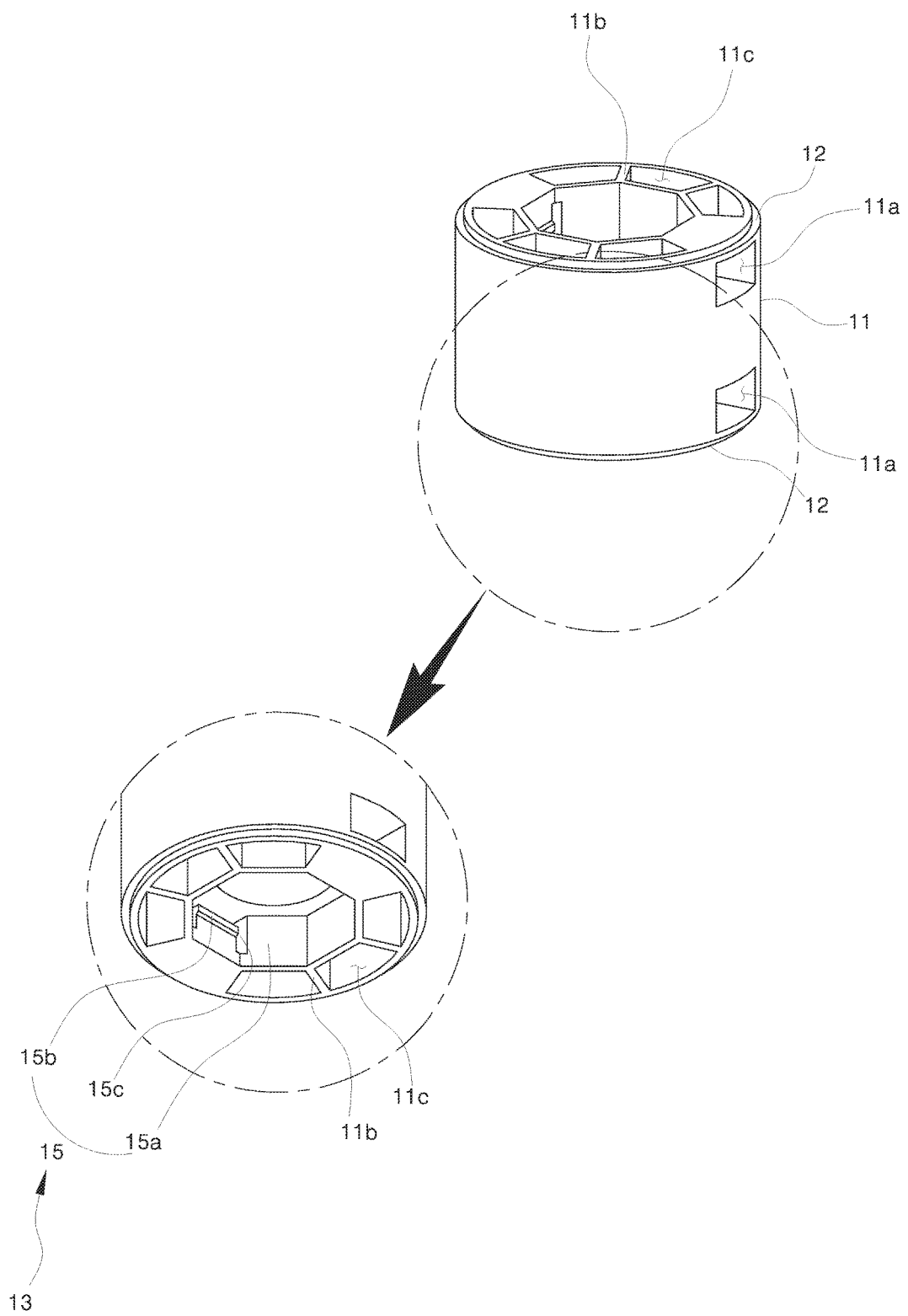
FIG. 15 is a perspective view showing a female coupling part formed on both surfaces of a drum according to an embodiment of the present disclosure.
Figure 16:
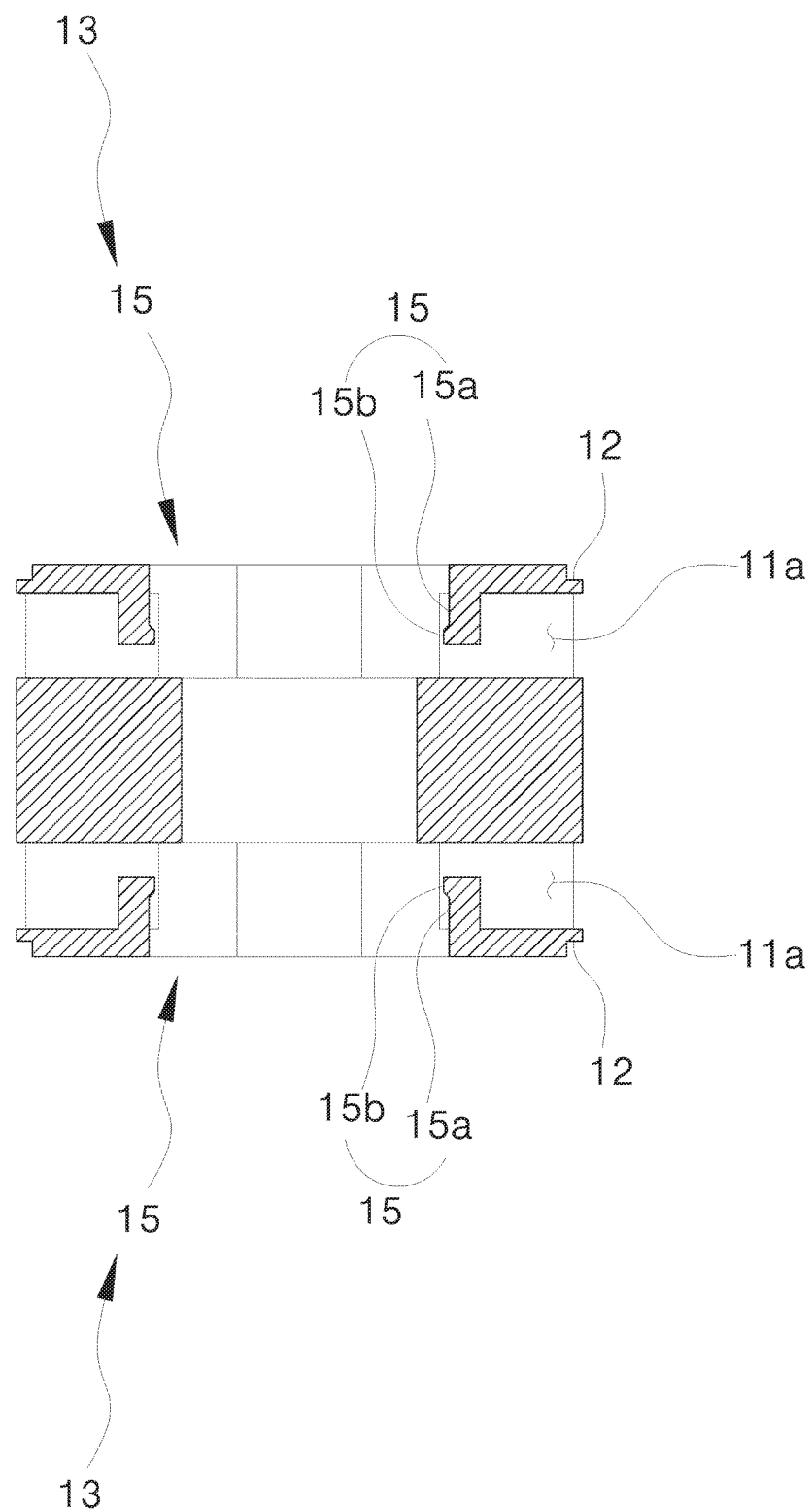
FIG. 16 is a sectional view of the drum of FIG. 15 according to an embodiment of the present disclosure.

FIG. 4 is a perspective view showing a structure of a drum according an embodiment of the present disclosure. FIG. 5 is a sectional view of the drum of FIG. 4 according to an embodiment of the present disclosure. FIG. 13 is a perspective view showing a male coupling part formed on both surfaces of a drum according to an embodiment of the present disclosure. FIG. 14 is a sectional view of the drum of FIG. 13 according to an embodiment of the present disclosure. FIG. 15 is a perspective view showing a female coupling part formed on both surfaces of a drum according to an embodiment of the present disclosure. FIG. 16 is a sectional view of the drum of FIG. 15 according to an embodiment of the present disclosure.

In an implementation, referring to FIGS. 4 and 5, the coupling part 13 formed on the drum 10 includes male and female coupling parts 14 and 15 which are formed at both sides of the cylindrical body 11 one by one. However, the male coupling part 14 may be formed to protrude from both sides of the drum as shown in FIGS. 13 and 14 or the female coupling part 15 may be formed to be concaved from both sides of the drum as shown in FIGS. 15 and 16.

Therefore, the mounting structure of the wheel 1 may be more various. Further, since the drum 10 which is manufactured in various shapes may be independently used as an assembly member of a prefabricated toy using a chain block, when a structure using a chain block is built in, while the choice of selection is widened, a structure having more various shapes or functions may be built up.

The male coupling part 14 may be provided around a protrusion wall 14a constituting a polygonal configuration with a coupling groove 14b. The female coupling part 15 is provided with a coupling part 15b protruding from a concave wall 15a constituting a polygonal configuration, such that the male and female coupling parts 14 and 15 may be engaged with each other, thereby more tightly coupling the male and female coupling parts 14 and 15 to each other not to be separated from each other.

In this case, the coupling part 15b formed on the inner wall 15a is elastically operated forward and backward by a cut part 15c, such that, when the male coupling part 14 is fitted with the female coupling part 15, the male coupling part 14 may be more smoothly inserted into or separated from the female coupling part 15.

To form the coupling part 15b of the female coupling part 15, a molding hole 11a is preferably formed on a circumference of the cylindrical body 11 corresponding to a position of the coupling part 15b such that the coupling part 15b is formed. To form a plurality of ribs 11b on the cylindrical body 11, a blade removing part 11c is preferably formed to reduce the cost of materials and to be reinforced by the ribs 11b.

In addition, since the molding hole 11a is place at a part held with fingers when assembling or separating the drum 10, a user may more easily separate or insert the drum 10 whiling holding the molding hole 11a when assembling or disassembling the drum 10.

When the male coupling part 14 is formed to protrude or be concaved toward both sides of the drum, it is preferable to manufacture the male and female coupling parts 14 and 15 formed both surfaces to penetrate each other.

Meanwhile, the wheel assembly 20 is divided into two divided members 21 which are assembled with both sides of the drum 10.

The divided members 21 are fitted with each other through a fixing element 21a. Concavo convex surfaces 23 protrude from the circumferences of the divided members 21, so that the divided members 21 may be prevented from slipping when the divided members 21 make contact with the ground to be rotated when being used as the wheel 1.

Figure 17:
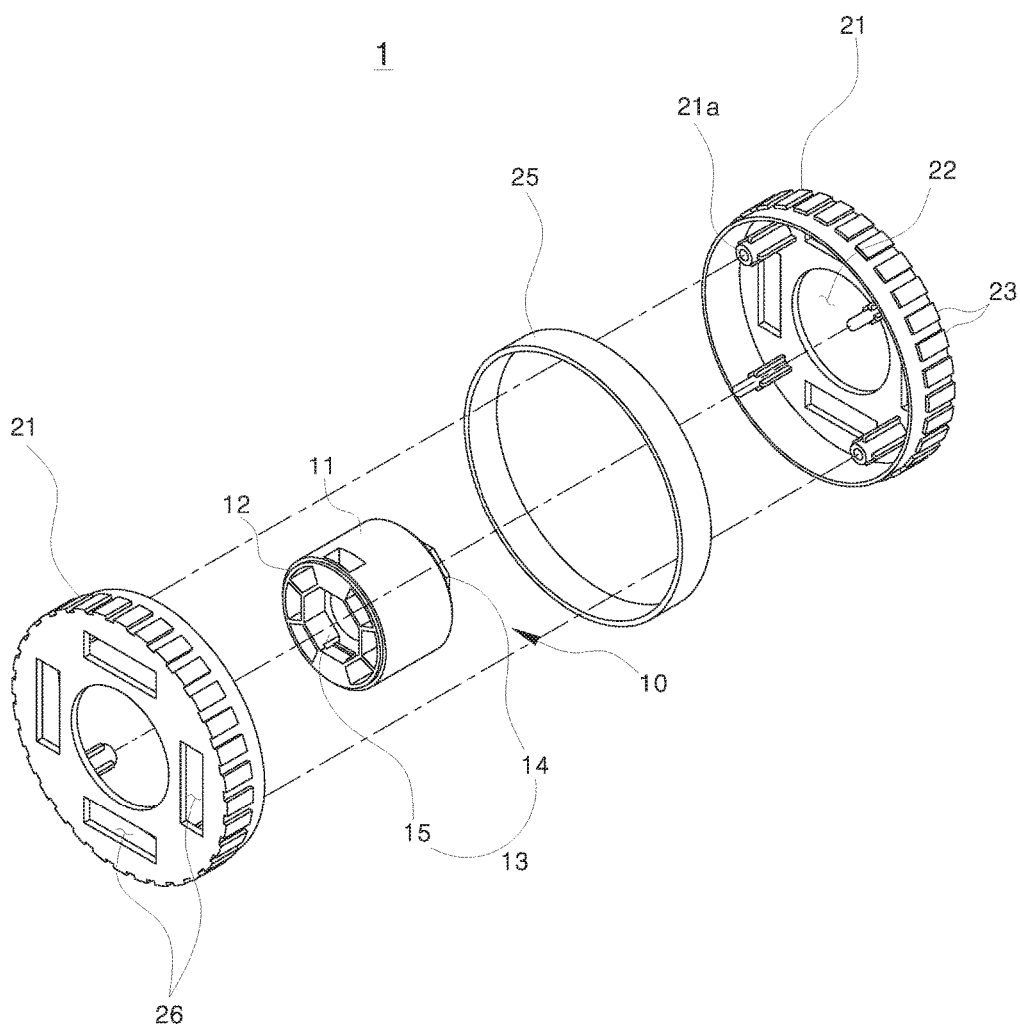
FIG. 17 is an exploded perspective view showing a wheel for a prefabricated toy using a chain block according to another embodiment of the present disclosure.

FIG. 17 is an exploded perspective view showing a wheel for a prefabricated toy using a chain block according to another embodiment of the present disclosure.

Referring to FIG. 17, the part divided members 21 are formed on parts, on which the divided member make contact with each other, with a mounting surface 24. The mounting surface 24 may be surrounded by a soft elastic ring 25 made of rubber or silicon such that the wheel has a non-slip function while the surface fabrication of the wheel is increased.

In this case, a thickness of the elastic ring 25 is preferably set to protrude slightly more than a height of the concavo convent surface 23.

In addition, when both surfaces of the wheel assembly 20 are provided with an inserting hole 26 having a rectangular shape, the assembly member 100 of a chain block may be inserted into the inserting hole 26 so that the structure is implemented in more various shapes.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wheel for a prefabricated toy using a chain block, the wheel comprising:
   a drum into which an assembly member of the chain block is inserted, and
   a wheel assembly which is assembled with the drum to spin without traction,
   wherein the drum comprises a cylindrical body and a sill formed on the cylindrical body, and is fitted into an install hole of the wheel assembly such that the drum and the wheel assembly are assembled with each other to idly spin,
   wherein the cylindrical body of the drum is provided on two sides thereof with a coupling part which is utilized for fitting the assembly member with the drum of the wheel,
   wherein the coupling part of the drum comprises a male coupling part having a convex shape formed on one side of the drum and a female coupling part having a concave shape formed on another side of the drum,
   wherein the male coupling part comprises a coupling groove around a protrusion wall constituting a polygonal configuration, and
   wherein the female coupling part comprises a protruding part protruding from a concave wall constituting the polygonal configuration so as to allow the male and female coupling parts of different drums to engage with each other.

2. The wheel of claim 1, wherein the male coupling part and female coupling part having an octagonal shape so as to allow the assembly member to insert into the drum at various angles.

3. The wheel of claim 1, wherein the protruding part formed on the concave wall is elastically operated forward and backward by a cut part such that the male coupling part is forcibly fitted with the female coupling part.

4. The wheel of claim 1,
   wherein the wheel assembly comprises two divided members which are assembled with the two sides of the drum,
   wherein a surface having an alternating recess and protrusion is formed on a circumference of each of the divided members, and
   wherein a mounting surface is formed along an outer peripheral surface of the divided members when the divided members make contact with each other and a soft elastic ring is mounted around the mounting surface, so that the wheel has a non-slip function.

* * * * *